US010297914B2

(12) United States Patent
Wang

(10) Patent No.: US 10,297,914 B2
(45) Date of Patent: May 21, 2019

(54) INDENTED ANTENNA ARRAY FOR TRANSMITTER TO RECEIVER ISOLATION

(71) Applicant: THE REGENTS OF THE UNIVERSITY OF CALIFORNIA, Oakland, CA (US)

(72) Inventor: Yuanxun Ethan Wang, Manhattan Beach, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 185 days.

(21) Appl. No.: 15/410,069

(22) Filed: Jan. 19, 2017

(65) Prior Publication Data
US 2017/0207532 A1 Jul. 20, 2017

Related U.S. Application Data

(60) Provisional application No. 62/280,982, filed on Jan. 20, 2016.

(51) Int. Cl.
H01Q 1/48 (2006.01)
H01Q 1/50 (2006.01)
(Continued)

(52) U.S. Cl.
CPC ............... H01Q 3/32 (2013.01); H01Q 1/48 (2013.01); H01Q 1/50 (2013.01); H01Q 1/523 (2013.01);
(Continued)

(58) Field of Classification Search
None
See application file for complete search history.

(56) References Cited

U.S. PATENT DOCUMENTS 5,027,125 A 6/1991 Tang
6,434,372 B1 * 8/2002 Neagley ............... G01S 13/756
340/10.4

(Continued)

FOREIGN PATENT DOCUMENTS

KR 1020110049113 A 5/2011
WO 2015042983 A1 4/2015

OTHER PUBLICATIONS

Deal et al. ("A New Quasi-Yagi Antenna for Planar Active Antenna Arrays", IEEE Transactions of Microwave Theory and Techniques, vol. 48, No. 6, Jun. 2000).*

(Continued)

Primary Examiner — Ricardo I Magallanes
(74) Attorney, Agent, or Firm — O'Banion & Ritchey LLP; John P. O'Banion

(57) ABSTRACT

An apparatus and method for enhancing full-duplex radio communications using an indented transmitter and receiver antenna. A multi-element antenna array is configured with each antenna coupled to a circulator that has connections to both a transmission path and a receiving path. The apparatus is configured with indentations that provide a tilting of the array from its broadside to create a progressive phase delay between adjacent pairs of elements. Transmitted and received waves travel a single trip through the indention, while antenna reflection or circulator leakage travels a round trip through indention, so that these signal components can be readily separated to achieve high levels of isolation during full-duplex transmitting and receiving.

20 Claims, 4 Drawing Sheets

(51) Int. Cl.

| | | |
|---|---|---|
| *H01Q 1/52* | (2006.01) | |
| *H01Q 3/32* | (2006.01) | |
| *H04B 1/44* | (2006.01) | |
| *H04L 5/14* | (2006.01) | |
| *H01Q 19/30* | (2006.01) | |
| *H01Q 21/00* | (2006.01) | |
| *H04B 1/525* | (2015.01) | |

(52) U.S. Cl.
CPC ......... *H01Q 19/30* (2013.01); *H01Q 21/0075* (2013.01); *H04B 1/44* (2013.01); *H04L 5/1461* (2013.01); *H01Q 1/525* (2013.01); *H04B 1/525* (2013.01)

(56) References Cited

U.S. PATENT DOCUMENTS 10,044,492 B2 *  8/2018  Liu ..................... H01Q 1/525
2011/0267998 A1  11/2011  Meharry

OTHER PUBLICATIONS

Korean Intellectual Property Office (KIPO), International Search Report and Written Opinion dated Apr. 28, 2017, counterpart PCT international application No. PCT/US2017/014420, pp. 1-12, with claims searched, pp. 13-17.

Xu, Qiang et al., "Transmit-receive (T/R) isolation enhancement with an indented antenna array", Proceedings of the 2015 IEEE Radio and Wireless Symposium (RWS), Jan. 25-28, 2015, pp. 168-170.

* cited by examiner

INDENTED ANTENNA ARRAY FOR TRANSMITTER TO RECEIVER ISOLATION

CROSS-REFERENCE TO RELATED APPLICATIONS

This application claims priority to, and the benefit of, U.S. provisional patent application Ser. No. 62/280,982 filed on Jan. 20, 2016, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a full duplex antenna arrays, and more particularly to a full-duplex antenna array utilizing indenting to improve transmit to receive isolation.

2. Background Discussion

Full-duplex radios are useful in numerous applications toward simplifying system hardware architectures and networking layer control protocols, while increasing spectral efficiencies since a full-duplex radio is able to "talk and listen" at the same time and same frequency. An additional benefit of a full-duplex radio is that fixed diplexer filters that are essential in conventional frequency duplex systems are no longer required in the full-duplex RF front-end. Consequently use of full duplex radios unleash further potential whereby radio operating frequency and bandwidth is selectable leading to a completely software reconfigurable radio system, for example cognitive radios for ultimately efficient usage of the spectrum.

In order for full-duplex radios to operate properly, the transmitter to receiver interferences must be sufficiently suppressed to prevent the transmitter signal and noise power leaked to the receiver from saturating the receiver and creating distortion. There are various conventional ways to reduce radio self-interference through antenna isolations. For space conscious applications, such as radios in mobile terminals, approaches to achieve the T/R isolation include the utilization of the pattern diversity, e.g., placing the receiving antenna at the nulls of the transmitting antenna array pattern, polarization diversity with an orthomode transducer (OMT) or circularly polarized antennas, and non-reciprocity with circulators. The spatial diversity approach cannot be applied to directional radios, where the pattern of the transmitting antenna is required to be identical to that of the receiving antenna. The polarization diversity approach also limits the choices of polarization in the transmission and reception of the waves. The non-reciprocity approach with circulators can only offer limited isolation and it is ineffective to the leakage from the antenna reflection of the transmitted power.

Accordingly, a need exists for full duplex radios with increased levels of transmitter-receiver isolation. The present disclosure fulfills that need and overcomes shortcomings of previous isolation techniques.

BRIEF SUMMARY

The technology of this disclosure offers a new technique to realize high antenna isolations that can be directly applied to the new class of radio systems that are called full-duplex radio, which transmit and receive signal and information at the same frequency and the same time. The technology will offer a practical and simple way to enhance the antenna isolation while allowing the array being used for beamforming or gain enhancements.

In the present disclosure the antenna array is indented to increase transmitter to receiver isolation. The indenting involves tilting said N-element antenna array from its alignment line. In at least one embodiment, the tilt has a constant slope which is selected to create a linear progressive phase delay between each adjacent pair of elements of the N-element antenna array. At least one transmission line is added between each transmitting path and transmitter circulator, while similarly at least one transmission line is added between each receiver circulator and each receiving path. In response to these changes transmission line distances are changed so that each transmission line has a linear progressive phase difference between each adjacent pair of elements of the N-element antenna array toward increasing isolation during full-duplex transmission and receiving which occur at the same frequency and same time.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

An antenna isolation enhancement technique is disclosed which is based on breaking spatial symmetry between transmitting/receiving (T/R) signal paths and the transmitter to receiver leakage path. Physically, this is accomplished by selectively indenting the antenna elements in an array from the conventional configuration of broadside alignments, preferably toward a specific tilted relationship. The different phase delay characteristics of the T/R paths in the disclosed indented antenna array improve the T/R isolation from what is offered by circulators while suppressing leakage due to antenna reflection and mutual coupling among antenna elements. The leakage power in this configuration is suppressed without limiting the choices of antenna polarizations and radiation patterns.

The approach behind the disclosed indented array is that when antenna elements are offset away from a broadside alignment, the transmitting or receiving waves travel a single trip through the indent, while the antenna reflection or circulator leakage must traverse a round trip through the indention (EM wave travels from one end to the other end, if it gets reflected it comes back with a round-trip phase and delay), which allow the separation of these two mechanisms with passive delay lines and a power combiner.

Figure 1:
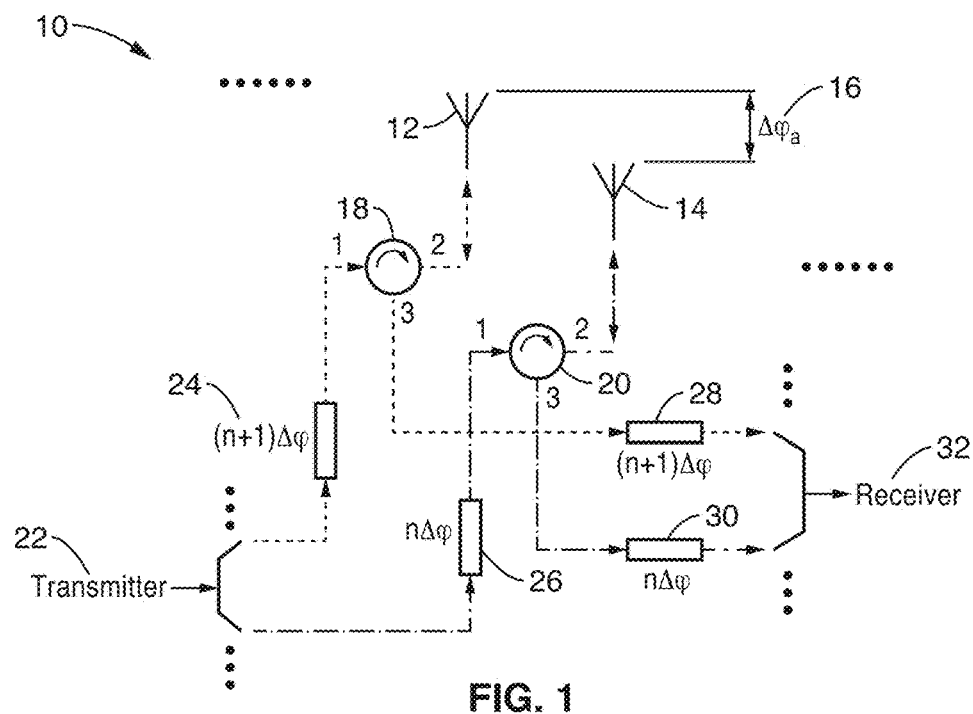
FIG. 1 is a block diagram of an indented antenna array with high isolation according to an embodiment of the present disclosure.

FIG. 1 illustrates an example embodiment 10 of an indented array for a monostatic setting with circulators. The N-element antenna array 12, 14 (and so forth) is tilted 16 from its broadside to create an indentation, such as with a constant slope that is preferably selected to create a linear progressive phase delay of $\Delta\varphi_a$ between each adjacent pair of elements 12, 14. It will be appreciated that for the sake of simplicity of illustration the figure depicts two antennas, while the disclosed technique can be extended to any sized antenna array. In at least one embodiment, this antenna array is a quasi-Yagi dipole antenna with and associated feeding network. The antennas are coupled to a port on circulators 18, 20. Transmission lines with a linear progressive phase difference 24, 26, 28, 30, between each pair are added between each of the transmitting paths from transmitter input 22 to the circulator, and between the circulator along each receiving path to receiver output 32. In order to keep both the transmitting and receiving antenna patterns toward the broadside, one may choose phase delay difference $\Delta\varphi=\Delta\varphi_a$ to cancel the phase difference between the antenna elements in the broadside radiation.

The leakage power is reduced as comparing to a single channel antenna array according to the following factor, $$\left|\frac{V_{leakage}}{V_{n3}}\right|^2 = \left|\frac{\sin N\Delta\varphi}{N\sin\Delta\varphi}\right|^2. \tag{1}$$

Figure 2:
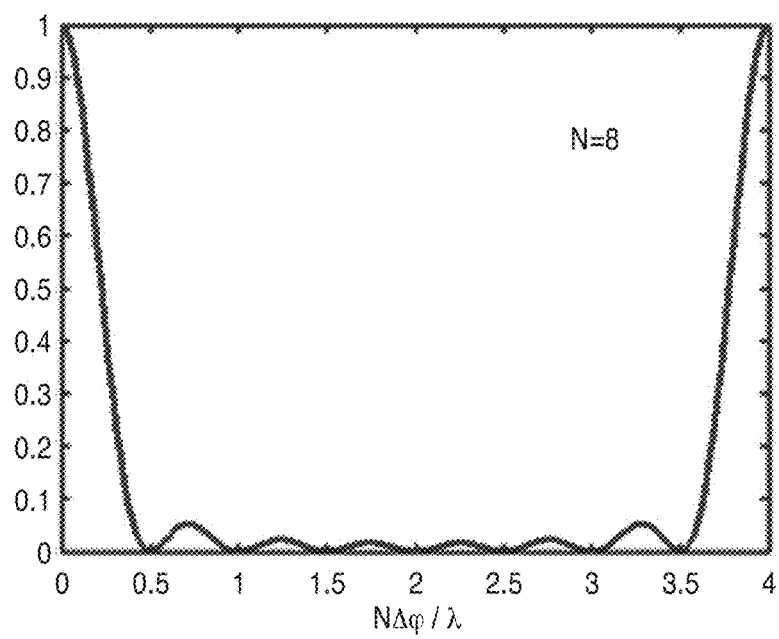
FIG. 2 is a plot of leakage power for an indented array according to the present disclosure as compared to that of a single element antenna.

FIG. 2 shows the T/R leakage power and antenna array return loss reduction when number of antennas (N) depicted is N=8 with respect to $N\Delta\varphi/\lambda$. It is concluded that the leakage power will be further reduced with additional increases of N, although the disclosure is effective for any value of N>1. In addition, for a small number of antenna elements, one can choose to operate at the first null of the discrete SINC function, which corresponds to $N\Delta\phi=\lambda/2$ at the lowest operating frequency. Tapering the transmitting power over the antenna aperture may help to achieve a broadband and deeper T/R isolation, in a way similar to how side lobes in a phased array can be suppressed. It will be noted that there are N−1 nodes seen in the response, so with N=8 there are 7 nodes in the response, while for N=4 there are 3 nodes in the response curve.

In order to validate the techniques of the present disclosure, the circuit of FIG. 1 was configured with a four-element indented quasi-Yagi dipole antenna array and the associated feeding network were designed and fabricated with a center frequency at 3.35 GHz. A quasi-Yagi dipole antenna was configured with a single microstrip feed, with a microstrip-to-coplanar strips (CPS) transition that acts as a balun.

Figure 3:
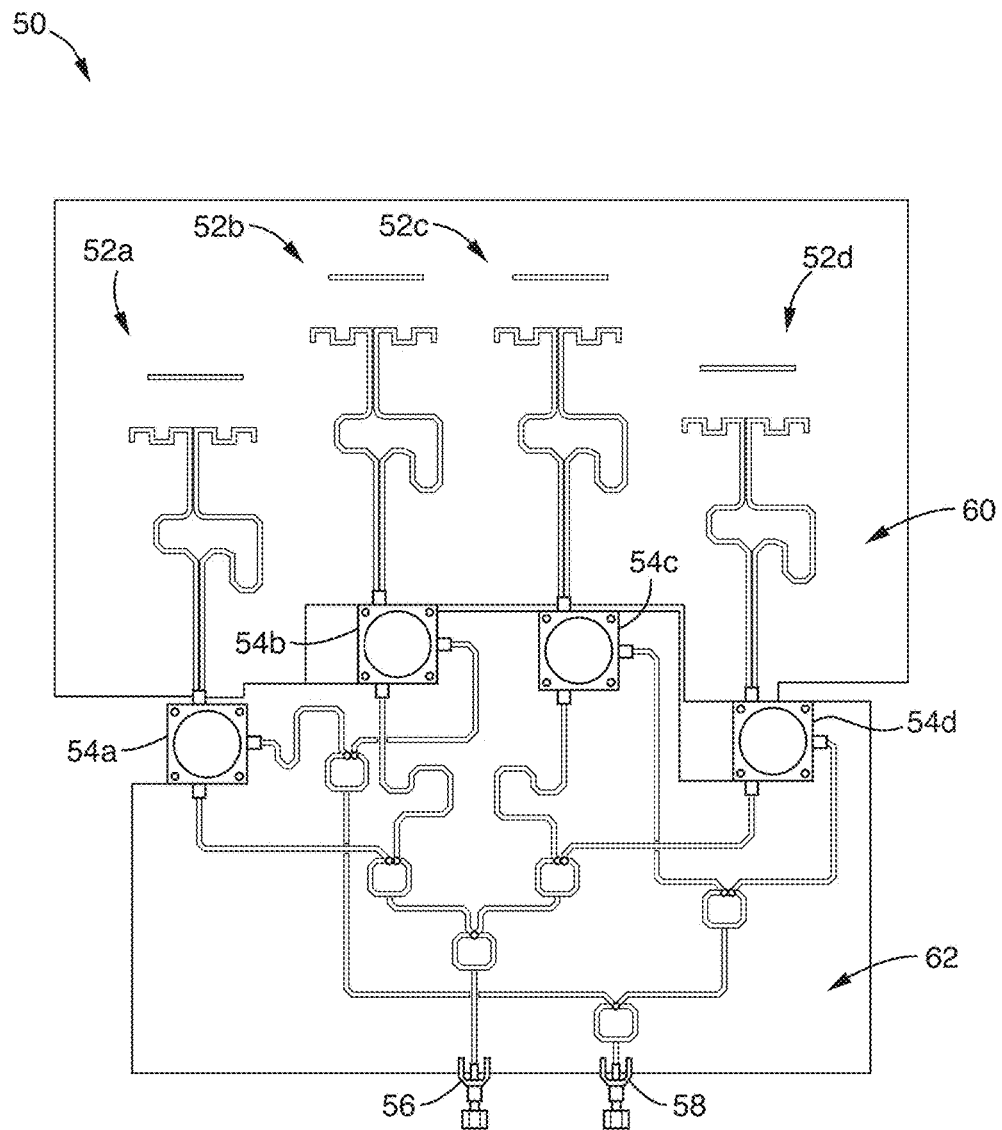
FIG. 3 is an image rendition of a four-element indented quasi-Yagi antenna array prototype according to an embodiment of the present disclosure.

FIG. 3 illustrates an example embodiment 50 of a 4-element indented antenna array, shown with elements 52a, 52b, 52c, 52d, such as fabricated on a Rogers 4350 substrate. By way of example and not limitation, the circuit is shown fabricated on two separate printed circuit boards (PCBs) 60, 62 to simplify fabrication, as gaps are utilized for flush mounting of the drop in components. Four circulators 54a, 54b, 54c, 54d, are used in this embodiment, with each placed between transmitting paths, receiving paths 56, 58 and the quasi-Yagi antenna 52a, 52b, 52c and 52d.

The specification of the off-the-shelf circulator has an isolation of −20 dB, insertion loss of 0.25 dB and VSWR of 1.25 from 3.3 GHz to 3.4 GHz. After fabrication, the return loss and mutual coupling of quasi-Yagi dipole elements are measured and both are reduced significantly from that of a single antenna.

Figure 4:
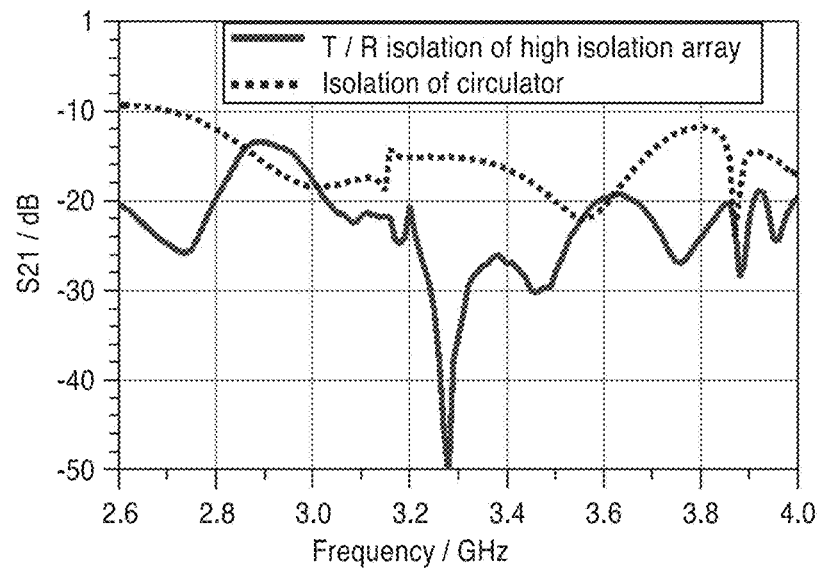
FIG. 4 is a plot of measured isolation for the indented quasi-Yagi antenna array according to an embodiment of the present disclosure as compared to that of a single circulator.

FIG. 4 depicts that the average isolation from 3.3 GHz to 3.4 GHz has been increased to 30 dB from an average of 15 dB that is provided by a single circulator.

Figure 5:
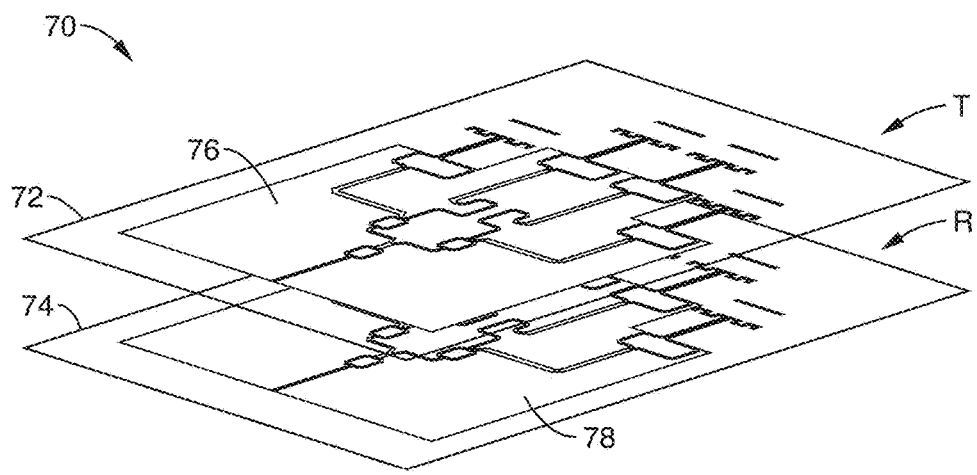
FIG. 5 is a pictorial view of a stacked transmitting/receiving array with indention for high isolation according to an embodiment of the present disclosure.

FIG. 5 illustrates an example embodiment 70 of stacked transmitting/receiving arrays shown with a transmitter array 72, and a receiving array 74. It is seen in this figure that the monostatic setting can be extended to develop transmitting/receiving (T/R) antenna arrays with high isolation. In this case, the transmitter and receiver can be placed in different arrays. The limit to the transmitter/receiver isolation is determined by the mutual coupling between the two arrays. It is not difficult to prove that the indented array creates a similar leakage reduction factor for the mutual coupling between the stacked transmitting/receiving arrays as shown in the figure. Truncated ground planes 76, 78 are seen respectively for each array board 72, 74, respectively.

Figure 6:
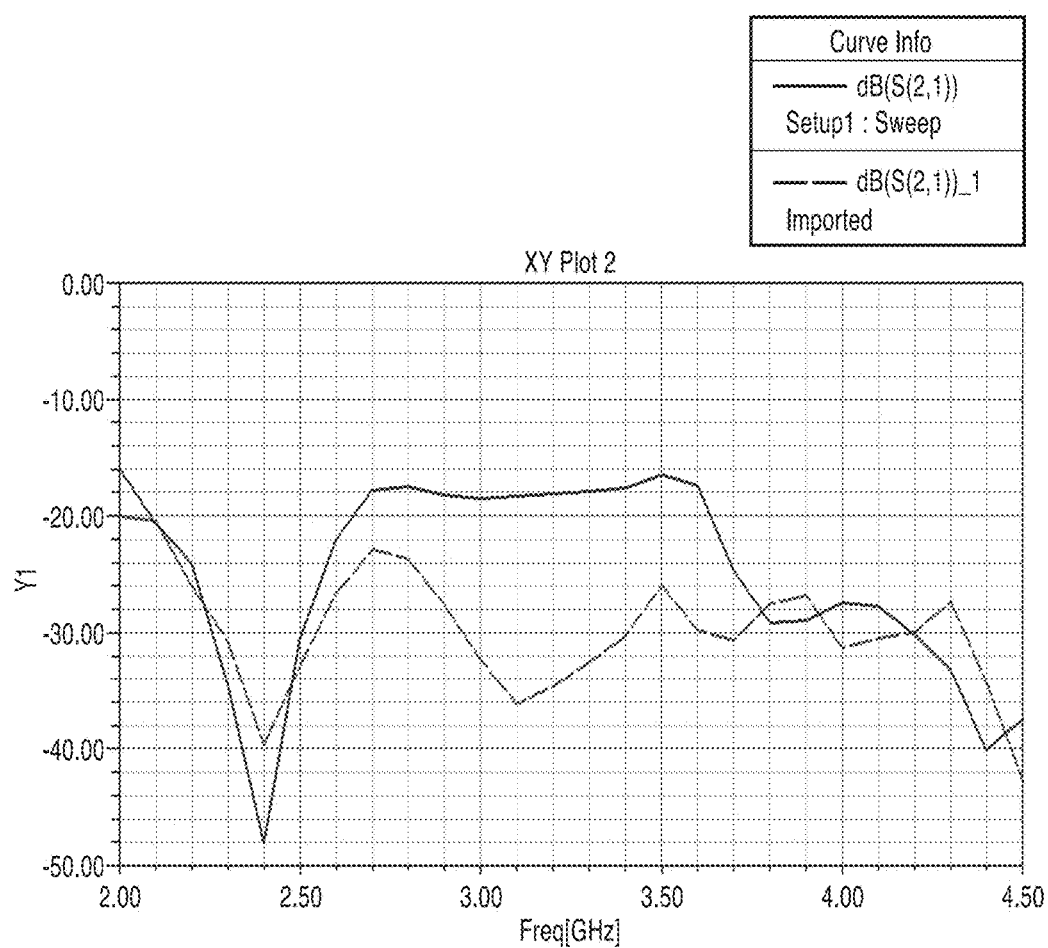
FIG. 6 is a plot of simulated antenna isolation between a two standard 4-element quasi-Yagi array, and an indented quasi-Yagi array according to an embodiment of the present disclosure.

FIG. 6 illustrates simulation results showing up to 15 dB improvement is achieved in lowering antenna mutual coupling at the center frequency of 3.3 GHz as seen in this plot.

From the description herein, it will be appreciated that that the present disclosure encompasses multiple embodiments which include, but are not limited to, the following:

1. An indented transmitter and receiver antenna apparatus, comprising: (a) an N-element antenna array, wherein N is greater than one; (b) indentations of said N-element antenna array for increasing transmitter to receiver isolation by said indentations creating a tilting of said N-element antenna array from its broadside; (c) wherein said tilting has a constant slope configured to create a linear progressive phase delay between each adjacent pair of elements of the N-element antenna array; and (d) a circulator coupled to each antenna in said N-element antenna array; (e) a transmitting path and a receiving path connecting to each circulator; (f) wherein said transmitting path comprises at least one transmission line leading to each circulator; (g) wherein said receiving path comprises at least one transmission line leading to each circulator; and (h) a linear progressive phase difference between said transmission lines for adjacent pairs of elements of said N-element antenna array which is configured to increase isolation during full-duplex transmission and receiving.

2. The apparatus of any preceding embodiment, wherein said indented transmitter and receiver antenna apparatus is configured for maintaining both transmitting and receiving antenna patterns toward the broadside, in response to canceling phase difference between elements of said antenna array for broadside radiation.

3. The apparatus of any preceding embodiment, wherein said canceling phase difference is performed by selecting a phase delay difference.

4. The apparatus of any preceding embodiment, wherein said indented transmitter and receiver antenna apparatus breaks spatial symmetry between transmitting and receiving signal path and transmitter to receiver leakage path.

5. The apparatus of any preceding embodiment, wherein antenna elements of said indented transmitter and receiver antenna apparatus are offset away from alignment with the broadside, with the transmitting or receiving waves traveling a single trip through the indention once, while the antenna reflection or circulator leakage travels a round trip through the indention, which allows separation of signal components with passive delay lines and a power combiner.

6. The apparatus of any preceding embodiment, wherein different phase delay characteristics of the transmission and receiving paths in said indented transmitter and receiver antenna apparatus improve transmitter-receiver isolation over the use of circulators while suppressing leakage power due to antenna reflection and mutual coupling among antenna elements.

7. The apparatus of any preceding embodiment, wherein said indented transmitter and receiver antenna apparatus is configured to suppress leakage power without limiting selections of antenna polarizations and radiation patterns.

8. The apparatus of any preceding embodiment, wherein said indented transmitter and receiver antenna apparatus comprises a multi-element indented quasi-Yagi dipole antenna array with an associated feeding network.

9. The apparatus of any preceding embodiment, wherein feeding said quasi-Yagi dipole antenna is a single microstrip feed, wherein microstrip-to-coplanar strips (CPS) transition on its substrate acting as a balun.

10. The apparatus of any preceding embodiment, further comprising truncated ground planes on a backside of a substrate for said indented transmitter and receiver antenna apparatus to create a reflector to achieve an endfire radiation pattern.

11. An indented apparatus for isolating a transmitter and receiver, comprising: (a) an N-element antenna array; (b) a circulator associated with each antenna of said N-element antenna array; (c) wherein a receiver is coupled to a port on each circulator on adjacent antennas in said N-element antenna array; (d) wherein a transmitter is coupled to another port on each circulator for adjacent antennas in said N-element antenna array; (e) wherein said N-element antenna array is configured with a tilt from its broadside to achieve indenting of said antenna array to increase transmitter to receiver isolation; (f) wherein said tilting has a constant slope configured to create a linear progressive phase delay between each adjacent pair of elements of the N-element antenna array; and (g) at least one transmission line coupled between each transmitting path and transmitter circulator, and at least one transmission line coupled between each receiver circulator and each receiving path; (h) wherein antenna elements of said indented transmitter and receiver antenna apparatus are offset away from alignment with broadside, with transmitting or receiving waves traveling a single trip through indention once, while antenna reflection or circulator leakage travels a round trip through indention, thus allowing separation of signal components with passive delay lines and a power combiner to provide a linear progressive phase difference between each adjacent pair of elements of said N-element antenna array to achieve high levels of isolation during full-duplex transmitting and receiving.

12. A method of isolating a transmitter and receiver, comprising steps: (a) indenting an antenna array for increasing transmitter to receiver isolation; (b) tilting said N-element antenna array from its broadside to achieve said indenting; (c) wherein said tilting has a constant slope configured to create a linear progressive phase delay between each adjacent pair of elements of said N-element antenna array; and (d) coupling at least one transmission line between each transmitting path and transmitter circulator, and coupling at least one transmission line between each receiver circulator and each receiving path; (e) wherein each said transmission line has a linear progressive phase difference between each adjacent pair of elements of said N-element antenna array; and (f) whereby leakage power is suppressed without limiting selections of antenna polarizations and radiation patterns, and while transmitter-receiver isolation is increased for full-duplex operation occurring simultaneously at a same frequency.

13. The method of any preceding embodiment, further comprising maintaining both transmitting and receiving antenna patterns toward broadside, in response to canceling phase difference between elements of said antenna array for broadside radiation.

14. The method of any preceding embodiment, wherein said canceling of phase difference is performed in response to selecting a phase delay difference affected the amount of said tilting.

15. The method of any preceding embodiment, wherein said indented antenna array breaks spatial symmetry between transmitting and receiving signal path and transmitter to receiver leakage path.

16. The method of any preceding embodiment, wherein antenna elements of said indented antenna array are offset away from alignment with broadside, so that transmitting and receiving waves travel a single trip through the indention, while antenna reflection or circulator leakage travels a round trip through indention, which allows separating signal components with passive delay lines and a power combiner.

17. The method of any preceding embodiment, wherein different phase delay characteristics of the transmission and receiving paths in said indented antenna array improve transmitter-receiver isolation over use of circulators while suppressing leakage power due to antenna reflection and mutual coupling among antenna elements.

18. The method of any preceding embodiment, wherein said N-element antenna array comprises a multi-element indented quasi-Yagi dipole antenna array coupled with an associated feeding network configured in said method.

19. The method of any preceding embodiment, wherein feeding said quasi-Yagi dipole antenna is a single microstrip feed, wherein microstrip-to-coplanar strips (CPS) transition on its substrate acting as a balun.

20. The method of any preceding embodiment, further comprising truncating a ground plane on a backside of a substrate for said N-element antenna array to create a reflector serving as a reflector to achieve an endfire radiation pattern.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An indented transmitter and receiver antenna apparatus, comprising:
   an N-element antenna array, wherein N is greater than one;
   indentations of said N-element antenna array for increasing transmitter to receiver isolation by said indentations in response to tilting said N-element antenna array from its broadside, while remaining in the same plane and facing approximately a same direction;
   wherein said tilting has a constant slope configured to create a linear progressive phase delay between each adjacent pair of elements of the N-element antenna array; and
   a circulator coupled to each antenna in said N-element antenna array;
   a transmitting path and a receiving path connecting to each circulator;
   wherein said transmitting path comprises at least one transmission line leading to each circulator;
   wherein said receiving path comprises at least one transmission line leading to each circulator; and
   a linear progressive phase difference between said transmission lines for adjacent pairs of elements of said N-element antenna array which is configured to interoperate with the indentations to increase isolation during full-duplex transmission and receiving, by having transmitter and receiver signals travel a single trip through the indentation while antenna reflection signals or circulator leakage signals must traverse a round trip through the indentation.

2. The apparatus as recited in claim 1, wherein said indented transmitter and receiver antenna apparatus is configured for maintaining both transmitting and receiving antenna patterns toward the broadside, in response to canceling phase difference between elements of said antenna array for broadside radiation.

3. The apparatus as recited in claim 2, wherein said canceling phase difference is performed by selecting a phase delay difference.

4. The apparatus as recited in claim 1, wherein said indented transmitter and receiver antenna apparatus breaks spatial symmetry between transmitting and receiving signal path and transmitter to receiver leakage path.

5. The apparatus as recited in claim 1, wherein antenna elements of said indented transmitter and receiver antenna apparatus are offset away from alignment with the broadside, with the transmitting or receiving waves traveling a single trip through the indention once, while the antenna reflection or circulator leakage travels a round trip through the indention, which allows separation of signal components with passive delay lines and a power combiner.

6. The apparatus as recited in claim 1, wherein different phase delay characteristics of the transmission and receiving paths in said indented transmitter and receiver antenna apparatus improve transmitter-receiver isolation over the use of circulators while suppressing leakage power due to antenna reflection and mutual coupling among antenna elements.

7. The apparatus as recited in claim 1, wherein said indented transmitter and receiver antenna apparatus is configured to suppress leakage power without limiting selections of antenna polarizations and radiation patterns.

8. The apparatus as recited in claim 1, wherein said indented transmitter and receiver antenna apparatus comprises a multi-element indented quasi-Yagi dipole antenna array with an associated feeding network.

9. The apparatus as recited in claim 8, wherein feeding said quasi-Yagi dipole antenna is a single microstrip feed, wherein microstrip-to-coplanar strips (CPS) transition on its substrate acting as a balun.

10. The apparatus as recited in claim 9, further comprising truncated ground planes on a backside of a substrate for said indented transmitter and receiver antenna apparatus to create a reflector to achieve an endfire radiation pattern.

11. An indented apparatus for isolating a transmitter and receiver, comprising:
   an N-element antenna array;
   multiple circulators, with each circulator having a port coupled to an antenna of said N-element antenna array;
   wherein a receiver is coupled through a receiving path to a port on each circulator on adjacent antennas in said N-element antenna array;
   wherein a transmitter is coupled through a transmitting path to another port on each circulator for adjacent antennas in said N-element antenna array;
   wherein said N-element antenna array is configured with a tilt from its broadside, while remaining in the same plane and facing approximately a same direction, to achieve indenting of said antenna array to increase transmitter to receiver isolation;
   wherein said tilting has a constant slope configured to create a linear progressive phase delay between each adjacent pair of elements of the N-element antenna array; and
   at least one transmission line coupled between each transmitting path and circulator, and at least one transmission line coupled between each circulator and each receiving path;
   wherein antenna elements of said indented transmitter and receiver antenna apparatus are offset away from alignment with broadside, which interoperates with phase differences along the transmission path and said receiving path, with transmitting or receiving waves traveling a single trip through indention once, while antenna reflection or circulator leakage travels a round trip through indention, thus allowing separation of signal components with passive delay lines and a power combiner to provide a linear progressive phase difference between each adjacent pair of elements of said N-element antenna array to achieve high levels of isolation during full-duplex transmitting and receiving.

12. A method of isolating a transmitter and receiver, comprising steps:

indenting an N-element antenna array for increasing transmitter to receiver isolation;

tilting said N-element antenna array from its broadside to achieve said indenting;

wherein said tilting has a constant slope configured to create a linear progressive phase delay between each adjacent pair of elements of said N-element antenna array; and coupling a transmitter through multiple transmission lines on transmitting paths to multiple circulators, and coupling a receiver through multiple transmission lines on receiving paths to the multiple circulators, wherein at least one transmission line is coupled between each transmitting path and each circulator, and between each circulator and each receiving path;

wherein each said transmission line has a linear progressive phase difference between each adjacent pair of elements of said N-element antenna array; and whereby said indentations and said linear progressive phase differences in the transmission lines interoperate to increase isolation during full-duplex transmission and receiving, by having transmitter and receiver signals travel a single trip through the indentation while antenna reflection signals or circulator leakage signals must traverse a round trip through the indentation, toward suppressing leakage power without limiting selections of antenna polarizations and radiation patterns, and while increasing transmitter-receiver isolation for full-duplex transmission and receiving.

13. The method as recited in claim 12, further comprising maintaining both transmitting and receiving antenna patterns toward broadside, in response to canceling phase difference between elements of said antenna array for broadside radiation.

14. The method as recited in claim 13, wherein said canceling of phase difference is performed in response to selecting a phase delay difference affected the amount of said tilting.

15. The method as recited in claim 12, wherein said indented antenna array breaks spatial symmetry between transmitting and receiving signal path and transmitter to receiver leakage path.

16. The method as recited in claim 12, wherein antenna elements of said indented antenna array are offset away from alignment with broadside, so that transmitting and receiving waves travel a single trip through the indention, while antenna reflection or circulator leakage travels a round trip through indention, which allows separating signal components with passive delay lines and a power combiner.

17. The method as recited in claim 12, wherein different phase delay characteristics of the transmission and receiving paths in said indented antenna array improve transmitter-receiver isolation over use of circulators while suppressing leakage power due to antenna reflection and mutual coupling among antenna elements.

18. The method as recited in claim 12, wherein said N-element antenna array comprises a multi-element indented quasi-Yagi dipole antenna array coupled with an associated feeding network configured in said method.

19. The method as recited in claim 18, wherein feeding said quasi-Yagi dipole antenna is a single microstrip feed, wherein microstrip-to-coplanar strips (CPS) transition on its substrate acting as a balun.

20. The method as recited in claim 12, further comprising truncating a ground plane on a backside of a substrate for said N-element antenna array to create a reflector serving as a reflector to achieve an endfire radiation pattern.

* * * * *